United States Patent [19]
Ghaem

[11] Patent Number: 5,170,866
[45] Date of Patent: Dec. 15, 1992

[54] MOTION-DAMPING DEVICE USING ELECTRORHEOLOGICAL FLUID

[75] Inventor: Sanjar Ghaem, Palatine, Ill.

[73] Assignee: Motorola, Inc, Schaumburg, Ill.

[21] Appl. No.: 678,415

[22] Filed: Apr. 1, 1991

[51] Int. Cl.$^5$ ............................................. F16F 15/03
[52] U.S. Cl. ................................. 188/267; 188/317; 188/319
[58] Field of Search ............... 188/267, 279, 280, 282, 188/297, 299, 313, 316, 317, 319; 267/140.1 AE, 140.1 E, 64.28

[56] References Cited

U.S. PATENT DOCUMENTS

| | | | |
|---|---|---|---|
| 3,240,295 | 3/1966 | Martinek et al. | 188/267 |
| 4,587,850 | 5/1986 | Moser | 188/299 X |
| 4,726,453 | 2/1988 | Obstfelder et al. | 188/299 X |
| 4,733,758 | 3/1988 | Duclos et al. | 188/267 |
| 4,742,998 | 5/1988 | Schubert | 267/136 |
| 4,749,070 | 6/1988 | Moser et al. | 188/299 |
| 4,798,369 | 1/1989 | Geno et al. | 267/64.28 X |
| 4,819,772 | 4/1989 | Rubel | 188/299 |
| 4,896,752 | 1/1990 | Shtarkman | 188/299 |
| 4,926,985 | 5/1990 | Mizuno et al. | 267/136 |
| 5,000,299 | 3/1991 | Goto et al. | 188/267 |
| 5,029,677 | 7/1991 | Mitsui | 188/299 X |

FOREIGN PATENT DOCUMENTS

| | | | |
|---|---|---|---|
| 151716 | 3/1951 | Australia | 188/317 |
| 3336965 A1 | 5/1985 | Fed. Rep. of Germany . | |
| 371076 | 2/1907 | France | 188/317 |
| 1282568 | 7/1972 | United Kingdom | 188/267 |

OTHER PUBLICATIONS

Bis Mackintosh, "Automotive Electronics, vol. 2, Control and Management Systems", 1987 p. 26.
Goto et al., "Toyota Active Control Suspension System for the 1989 Celica" pp. 857–860.
Micheberger et al., "Design of Active Suspension System for Road Vehicles", May 1990, pp. 213–217.

Primary Examiner—Robert J. Oberleitner
Assistant Examiner—Peter M. Poon

[57] ABSTRACT

A motion-damping device (10) includes a piston (18) moveably disposed within a housing (16) and dividing the interior of the housing into an upper chamber (20) and a lower chamber (22). An electrorheological fluid which fills both chambers can pass from one chamber to the other chamber via at least one fluid passageway (28) formed in the piston. Each passageway, tapered to form a relatively narrow neck portion, is in close proximity to an electrode that receives an electric potential for developing an electric field within the passageway to control the viscosity of fluid in the passageway.

20 Claims, 2 Drawing Sheets

MOTION-DAMPING DEVICE USING ELECTRORHEOLOGICAL FLUID

FIELD OF THE INVENTION

This invention pertains to motion-damping devices, including automotive shock absorbers, that use the properties of electrorheological fluid to control damping.

BACKGROUND OF THE INVENTION

Conventional motion damping devices, such as shock absorbers, typically use motors, solenoids and other moving parts to control the flow of a damping liquid (such as oil) within the device. These components must be small, operate within a very harsh environment and must be very reliable.

More recently, the manufacturers of some motion-damping devices have proposed to control damping through the use of an electrorheological fluid whose viscosity can be controlled electrically. The properties of such fluids and their electrical control are now well known. See, for example, U.S. Pat. Nos. 4,733,758 and 4,819,772.

The latter type of motion damping devices still suffer from certain disadvantages, including undesirable complexity. Further, and especially in the case of an automotive shock absorber, these devices do not have the ability to easily indicate the position of the moveable piston which is normally included in any shock absorber. Knowledge of the position of the piston is particularly useful in connection with active (electronically controlled) suspension systems.

BRIEF DESCRIPTION OF THE FIGS.

DESCRIPTION OF THE PREFERRED EMBODIMENT

Figure 1:
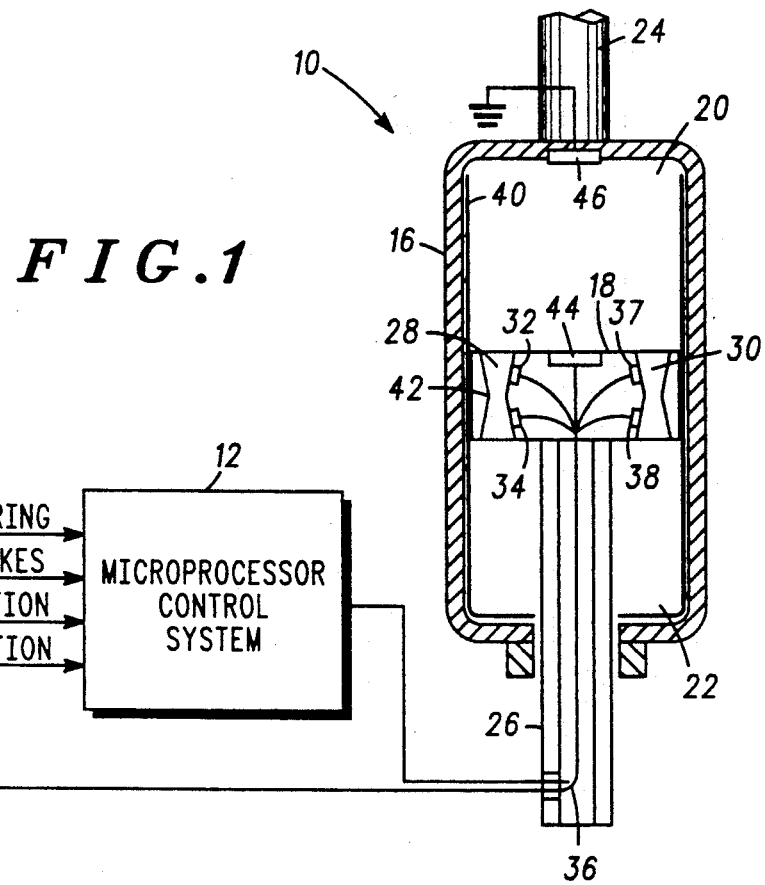
FIG. 1 shows, in partly schematic fashion, a motion-damping device according to the invention, the device being controlled by a microprocessor control system.

Referring to FIG. 1, a motion-damping device 10, shown in the form of an automotive shock absorber and constructed in accordance with the invention, is shown as being coupled to and controlled by a microprocessor control system 12. The system 12 can respond to input signals representative of steering, brakes and acceleration conditions for controlling the operation of the device 10. Likewise, the system 12 is responsive to a "position" signal (discussed more fully below) developed by the device 10 for controlling the operation of an active suspension system (not shown).

The motion-damping device 10 includes a housing 16 which encloses an interior space within which a piston 18 is disposed. This piston divides the interior space into first and second chambers 20, 22 which are filled with electrorheological fluid.

Mechanically coupled to the housing 16 is a rod 24 which may be connected to a wheel of an automobile. A piston rod 26, mechanically coupled to the piston 18, may be mechanically coupled to the automobile's chassis. With this arrangement, the housing 16 moves vertically (when oriented as shown in FIG. 1) with respect to the piston 18 in response to relative movement between the automobile's wheel and chassis. Alternately, the piston 18 may be the moveable component by reversing the mechanical coupling between the device 10 and the automobile.

As relative motion occurs between the piston 18 and the housing 16, the electrorheological fluid moves between the chambers 20 and 22. Such fluid movement occurs via at least one fluid passageway formed in the piston 18. The piston of FIG. 1 shows two such hourglass shaped passageways 28, 30 which are described in more detail below. Controlling the rate of fluid flow through the passageways affects the damping provided by the device 10.

Situated in close proximity to the passageway 28 is a pair of electrodes 32, 34 that are electrically coupled via a wire bus 36 to the system 12. As shown, the piston rod 26 is preferably hollow to provide a conduit for the bus 36.

Another pair of electrodes 37, 38 is situated in close proximity to the passageway 30. These electrodes are also coupled to the system 12 via the bus 36. In addition, a non-conductive sleeve 40 is positioned within the housing 16 and closely adjacent to, or abutting, the interior surface of the housing 16 which is typically at ground potential.

With the arrangement thus far described, the damping device 10 operates generally as follows. When it is desired to permit the fastest relative motion between the housing 16 and the piston 18 (minimum damping), no potential (or ground potential) is applied to the electrodes 32, 34, 37 and 38. This causes the viscosity of the fluid that flows through the passageways 28 and 30 to be at its minimum, whereby the fluid's flow rate is determined primarily by the size and geometry of the passageways 28 and 30.

When it is desired to restrict the fluid flow from the upper chamber 20 to the lower chamber 22, the system 12 applies an electric potential to at least one of the electrodes 32, 37. If this potential is applied only to the electrode 32, an electric field is generated within the upper half of the passageway 28, thereby increasing the viscosity of the fluid therein and reducing its flow rate. The larger the applied electric field is, the greater is the increase in the fluid's viscosity and the more limited is its flow rate. Given a large enough field, the flow rate of fluid through the passageway 28 is totally stopped. This is aided by the fact that the passageway is tapered, as shown, to form a relatively narrow neck portion 42 through which the highly viscous fluid cannot readily flow.

While the fluid flow through passageway 28 is being controlled, fluid flow through the other passageway 30 may be permitted to be at its maximum. However, if additional restriction of fluid is desired, an electric potential may also be applied to the electrode 37, thereby increasing the viscosity and reducing the flow rate of, the fluid in passageway 30.

It can be seen, therefore, that a substantial degree of control can be exerted over the rate of fluid flow between the chambers 20 and 22, all without the need for great complexity in the construction of the device 10.

Moreover, the degree of available control can be varied by increasing the number of fluid passageways, by applying an electric potential to only selected electrodes, and by varying the amplitude of the applied potential. Consequently, the motion damping device 10 is particularly well suited for use with electronically controllable suspension systems.

Another feature of the device 10 is that the relative position of the piston 18 within the housing 16 can be readily determined. For this purpose, a first or upper surface of the piston 18, which surface defines an end of the upper chamber 20, carries an electrode 44 that is electrically coupled to the system 12 via the wire bus 36. The opposite end of the chamber 20 includes a target area in which a target electrode 46 is situated. By applying an appropriate electric potential to the electrode 44, and by grounding the electrode 46, a measurable current flow is created between the electrodes 44 and 46. This current flow constitutes the "position" signal applied to the system 12 and is monitored to calculate the resistance of the fluid between the electrodes 44 and 46. Since the value of the resistance varies with variations in the distance between the electrodes 44 and 46, the calculated resistance value is readily converted to a signal indicative of the position of the piston 18. This information is also useful in the operation of electronically controlled suspension systems.

The piston, electrodes, and fluid passageways shown in FIG. 1 are illustrated in schematic form in order to more easily describe and depict the general nature of the device 10 and some of its operational characteristics. A more detailed description of these components will now be presented in connection with FIG. 2 which is an exploded view of these and some additional components not shown in FIG. 1.

Figure 3:
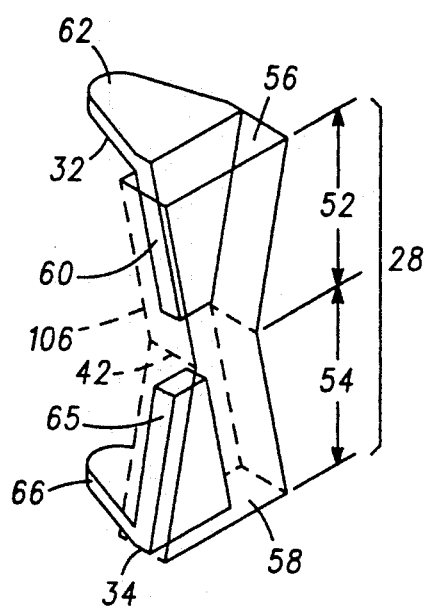
FIG. 3 illustrates the electrodes used in the embodiment of FIG. 2, and how they are located within fluid passageways in the piston shown in FIG. 2.
Figure 2:
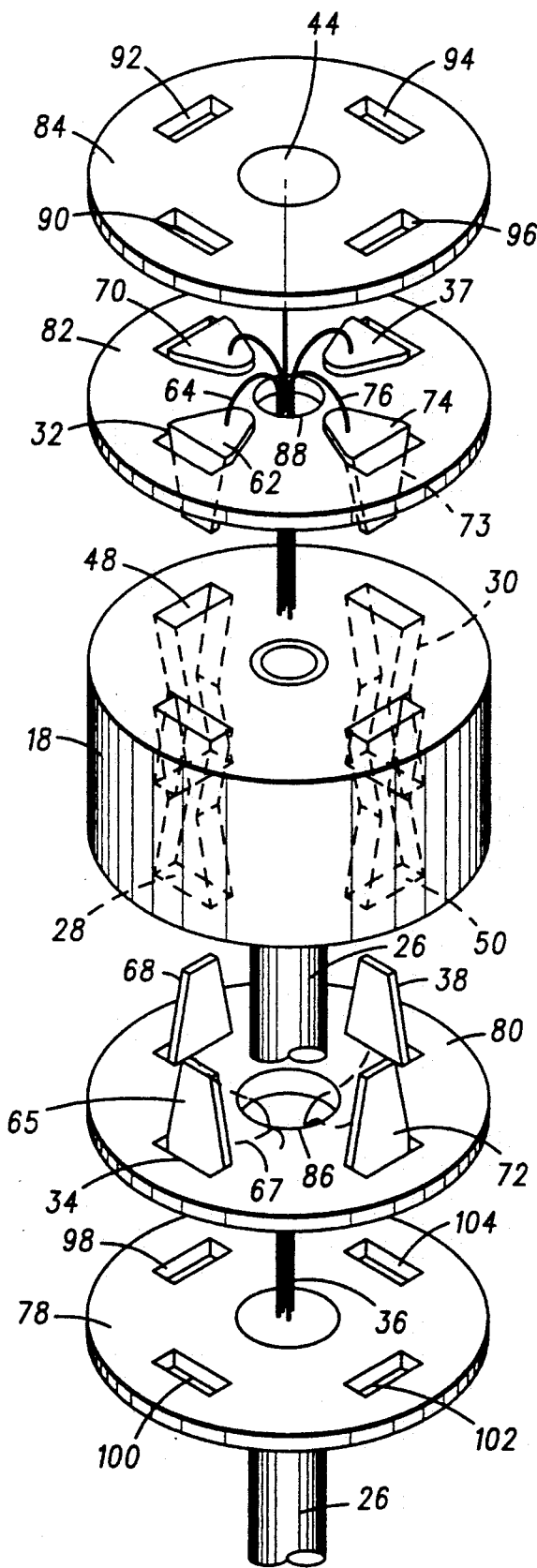
FIG. 2 is more detailed and exploded view of the piston, its electrodes and other associated components that are enclosed by the housing shown in FIG. 1.

Referring now to FIG. 2, the piston 18 is shown as preferably having four fluid passageways 28, 30, 48 and 50. The shape of these passageways and the electrodes which are situated therein, are best shown in FIG. 3 which specifically depicts the passageway 28 and its electrodes 32 and 34. The other passageways and their associated electrodes may be the same as is shown in FIG. 3.

The illustrated passageway 28 preferably includes a first orifice 52 which forms the upper half of the passageway 28, and a second orifice 54 which forms the lower half of the same passageway. As can be readily seen, the orifice 52 has a relatively large opening 56 that faces the upper chamber 20 (FIG. 1) and that continuously tapers downwardly to form the relatively narrow neck portion 42. Similarly, the orifice 54 has a relatively large opening 58 that faces the lower chamber 22 and that continuously tapers upwardly toward the neck portion 42. As a result, the entire passageway 28 has an hour-glass shape.

The electrode 32 that is situated within the orifice 52 includes a conductor 60 that is situated on the inner surface of the passageway 28, and a folded tab 62 that extends above the passageway for connection to a wire conductor 64 (FIG. 2) that forms part of the wire bus 36.

The electrode 34, electrically isolated from the electrode 32, includes a similar conductor 65 and folded tab 66. The latter element is coupled to the wire bus 36 via a wire conductor denoted by the dashed line 67 (FIG. 2).

Referring back to FIG. 2, the passageway 48 receives an electrode having a conductor 68 within its lower orifice, and, within its upper orifice, another electrode whose tab 70 is shown. Similarly, the passageway 50 receives an electrode having a conductor 72 within its lower orifice, and, within its upper orifice, another electrode having a conductor 73 and a tab 74. A conductive wire 76 couples the tab 74 to the wire bus 36.

It can be seen, therefore, that each of the four fluid passageways includes an upper electrode (eg. electrode 32) for controlling the flow of fluid in one direction, and a lower electrode (eg. 34) for controlling the flow of fluid in the opposite direction. It should also be noted that by confining each electrode to within a passageway, the electric field generated by the potential carried by an electrode is substantially confined to within the same passageway. This provides for better control over the flow of fluid with a relatively simple arrangement wherein each electrode affects fluid flow only in its associated passageway. This also permits different potentials to be applied to the different electrodes so as to provide a wide range of control over fluid flow.

To electrically insulate the electrodes from the piston and other nearby conductive surfaces, four insulating discs 78, 80, 82 and 84 may be provided. Referring first to the disc 80, it includes four apertures that are vertically aligned with the fluid passageways in the piston 18 so as to receive the conductors 65, 68, etc. and to permit the conductors to enter the lower orifices of the fluid passageways. A center aperture 86 allows the piston rod 26 to pass through the disc 80.

The disc 82 is similar to the disc 80 in that it includes four apertures through which the electrodes' conductors pass for insertion into the upper orifices of the fluid passageways 28, 30, 48 and 50. The tabs 62, 70, etc. of these electrodes bear on the top surface of the disc 82. The corresponding tabs of the lower group of electrodes 34, 38, etc. bear on the bottom surface of the disc 80. A central aperture 88 in the disc 80 provides a conduit for the wires in the wire bus 36.

The disc 84 which is situated immediately above the disc 82 has four fluid-carrying apertures 90, 92, 94 and 96. Each such aperture is aligned vertically with one of the fluid passageways in the piston 18, and with one of the apertures in the intermediate disc 82. Mounted centrally on the upper surface of the disc 84 is the electrode 44.

Referring now to the disc 78, it also has four fluid-carrying apertures 98, 100, 102 and 104. Each such aperture is aligned vertically with one of the fluid passageways in the piston 18 and with one of the apertures in the disc 80.

It should be apparent that the four electrode-carrying apertures in the disc 80, and the four electrode-carrying apertures in the disc 82, are each large enough to accommodate not only an electrode's conductor, but also to allow fluid flow therethrough. Thus, fluid from the upper chamber 20 flows to the lower chamber 22 (FIG. 1) through aperture 90, the immediately underlying aperture in disc 82 through which the electrode 32 extends, passageway 28 in piston 18, the aperture in disc 80 through which the electrode 34 extends, and then through the aperture 100 which communicates directly with the lower chamber 22. Fluid flow through the other apertures occurs in a similar manner.

One other insulating component is also included. Referring to FIG. 3, the portion of the piston 18 which forms an inside surface 106 of the passageway 28 is preferably insulated, as by anodizing the surface 106 to provide electrical isolation between the electrodes 32 and 34 and the piston. Similar surfaces of the other passageways in the piston include similar insulation.

In the embodiment discussed thus far, the fluid passageways formed in the piston are formed in an inner portion of the piston and are doubly tapered to form an intermediate neck portion 42 (FIG. 3). However, the fluid passageways can be formed with somewhat different geometries and formed in a different portion of the piston, as will now be described.

Figure 4:
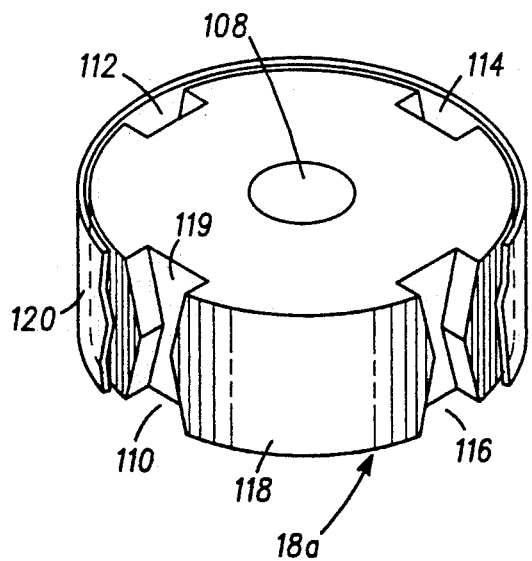
FIG. 4 is a perspective view of an alternate piston having passageways formed in its outer surface.

Referring to FIG. 4, a piston 18a has a central aperture 108 which forms a conduit for the wire bus 36. Four fluid passageways 110, 112, 114 and 116 are formed in the piston's outer surface 118. Each such passageway includes upper and lower tapered orifices that meet at a relatively narrow neck portion to form an hour-glass shape, all as described previously in connection with the FIG. 2 embodiment.

This piston 18a is particularly useful in applications where the piston is desirably smaller and less expensive than the piston 18. Moreover, the piston 18a may be made of plastic or metal. If metal is used for constructing the piston 18a, the inner surfaces of the passageways (such as surface 119) will be anodized or otherwise electrically insulated to insulate the piston 18a from an electrode which will be situated in each of the fluid passageways. The electrodes used with the fluid passageway 110, etc. may be identical to the electrodes 32 and 34 (FIG. 3), and the piston 18a may be substituted for the piston 18 in the arrangement shown in FIGS. 1 and 2.

In case the piston 18a is made of plastic, a conductive sleeve 120 may surround the piston 18a and may be grounded so as to establish an electric field between itself and the electrodes within each fluid passageway. Also, no insulation will be required on the inner surfaces (e.g. surface 119) of the fluid passageways.

Figure 5:
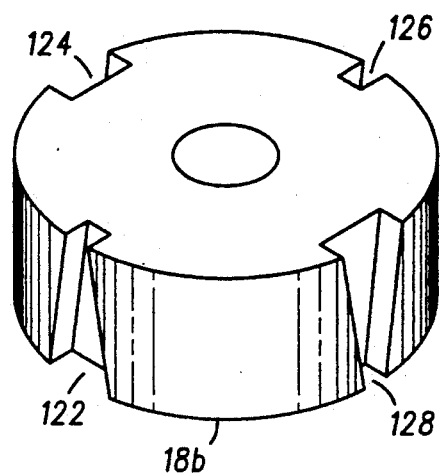
FIG. 5 shows another piston having a different kind of passageway formed in its outer surface.

Another small, low cost piston 18b is shown in FIG. 5 which is similar in all respects to the piston 18a (FIG. 4) except for the shape of the fluid passageways 122, 124, 126 and 128. In this case, each such passageway has a single orifice whose relatively large opening faces one of the chambers 20, 22, and which continuously tapers to a relatively narrow neck portion immediately adjacent to the other chamber. Passageways 122 and 126 have their larger orifices facing downwardly, while the larger orifices of passageways 124 and 128 face upwardly. In this embodiment, each such fluid chamber carries a single electrode, such as electrode 32 in FIG. 3. Since such an electrode does not extend below the piston 18b, the discs 78 and 80 may be omitted when the piston 18b is used in the arrangement shown in FIG. 2.

It will be appreciated that the motion-damping device described herein may be used to advantage in a number of applications. Its use as an automotive shock absorber has already been mentioned, but it may be used as well in other applications such as garage door openers, pistons for automobile trunks, etc. The ability of the device to provide information defining piston position is particularly useful in active suspension systems.

A further advantage of this device is that it can operate with relatively small electrode voltages and field energies because the electric fields which control the operation of the device are confined substantially to the fluid passageways.

What is claimed is:

1. a motion-damping device using electrorheological fluid, comprising:
   a housing enclosing an interior space;
   a piston moveably disposed within the housing and dividing the housing's interior space into first and second chambers which contain electrorheological fluid;
   at least one fluid passageway formed in the piston so as to permit fluid communication between the first and second chambers, said passageway comprising a relatively large opening which faces one of the chambers and which continuously tapers to form a relatively narrow neck portion; and
   electrode means situated in close proximity to the passageway for receiving an electric potential to generate an electric field within the passageway and control the flow of fluid between the chamber.

2. A device as set forth in claim 1 wherein the piston has a first surface defining an end of the first chamber, wherein a target area is situated at an opposite end of the first chamber, and including means for measuring the electrical resistance of the electrorheological fluid situated between the piston and the target area.

3. A device as set forth in claim 2 wherein the target area comprises a target electrode, and wherein the means for measuring includes an additional electrode mounted on the piston so as to create a measurable current flow between the target electrode and the additional electrode in response to an electric potential being applied between the target electrode and the additional electrode.

4. A device as set forth in claim 1 wherein the electrode means is situated so as to substantially confine the electric field to the passageway.

5. A device as set forth in claim 1 wherein the passageway comprises first and second tapered orifices, the first orifice having a relatively large opening facing the first chamber, the second orifice having a similar relatively large opening facing the second chamber, and both orifices tapering toward each other to form the relatively narrow neck portion.

6. A device as set forth in claim 5 wherein the electrode means includes a first electrode situated within the first orifice and a second electrode, electrically insulated from the first electrode, situated within the second orifice.

7. A device a set forth in claim 1 wherein each passageway comprises a single orifice having a relatively large opening immediately adjacent to one of the chambers and tapering to the relatively narrow neck portion immediately adjacent to the other chamber.

8. A device as set forth in claim 1 wherein the passageway has an inner surface and wherein the electrode means comprises a conductor situated on the passageway's inner surface and configured to substantially confine the electric field to within the passageway.

9. A device as set forth in claim 8 wherein the conductor includes a tab that extends outside of the passageway to receive the electric potential.

10. A device as set forth in claim 1 wherein the housing has an interior wall, wherein the piston includes an outer surface that is closely adjacent to the interior wall, and wherein the passageway is formed in the piston's outer surface.

11. A device as set forth in claim 10 wherein the passageway comprises a single orifice having a relatively large opening immediately adjacent to one of the chambers and tapering to the relatively narrow neck portion immediately adjacent to the other chamber.

12. A device as set forth in claim 10 wherein the passageway comprises first and second tapered orifices, the first orifice having a relatively large opening facing the first chamber, the second orifice having a similar relatively large opening facing the second chamber, and both orifices tapering toward each other to form the relatively narrow neck portion.

13. A device as set forth in claim 1 including a plurality of passageways formed in the piston, wherein the electrode means includes an electrode in each passageway, and wherein each electrode is electrically isolated from the other electrodes so that each electrode is independently controllable.

14. A motion-damping device using electrorheological fluid, comprising:
   a housing enclosing an interior space;
   a piston moveably disposed within the housing and dividing the housing's interior space into first and second chambers which contain electrorheological fluid;
   means defining at least one passageway between the first and second chambers;
   first electrode means for receiving an electric potential for creating an electric field for the purpose of controlling the flow of fluid through the passageway;
   second electrode means for receiving an electric potential to create a measurable current flow through the fluid in at least one of the chambers; and means responsive to the current flow for measuring the electrical resistance of the fluid in the latter chamber.

15. A device as set forth in claim 14 wherein the piston has a first surface defining an end of the first chamber, and wherein said second electrode means includes a target electrode situated at an opposite end of the first chamber, plus an additional electrode carried by the piston.

16. A device as set forth in claim 14 including a plurality a passageways formed in the piston, and wherein the first electrode means includes at least one electrode situated within each passageway.

17. A motion-damping device using electrorheological fluid, comprising:
   a housing enclosing an interior space;
   a piston having a first surface, being moveably disposed within the housing, and dividing the housing's interior space into first and second chambers which contain electrorheological fluid;
   a piston rod having one end coupled to the piston and an opposite end extending out of the housing;
   a plurality of passageways formed in the piston to permit fluid flow between the first and second chambers;
   a plurality of electrodes for receiving at least one electric potential so as to create electric fields that can control the flow of fluid through the passageways, at least one such electrode being situated within each one of the passageways;
   a further electrode carried by the first surface of the piston and situated so as to face the first chamber;
   a target electrode situated within the first chamber for establishing, in response to an applied electric potential between the target electrode and the further electrode, a measurable current in the fluid between the target electrode and the further electrode; and means responsive to said current for measuring the electrical resistance of the current-carrying fluid.

18. A device as set forth in claim 17 wherein the passageways are hour-glass shaped.

19. A device as set forth in claim 18 wherein the electric fields are confined substantially only to the passageways.

20. A motion-damping device using electrorheological fluid, comprising:
   a housing enclosing an interior space;
   a piston moveably disposed within the housing and dividing the housing's interior space into first and second chambers which contain electrorheological fluid;
   at least one fluid passageway formed in the piston so as to permit fluid communication between the first and second chambers, said passageway comprising first and second relatively large openings facing the first and second chambers, respectively, said openings tapering toward each other to form a relatively narrow neck portion;
   a first electrode for receiving an electric potential and situated in close proximity to the passageway so as to generate a first electric field between the first opening and the narrow neck portion; and
   a second electrode, insulated and separated from the first electrode, receiving an electric potential, and situated in close proximity to the passageway so s to generate a second electric field between the second opening and the narrow neck portion.

* * * * *